United States Patent
Fan et al.

(10) Patent No.: US 11,687,835 B2
(45) Date of Patent: Jun. 27, 2023

(54) DOMAIN SPECIFIC PRE-TRAINING OF CROSS MODALITY TRANSFORMER MODEL

(71) Applicant: Inception Institute of Artificial Intelligence Ltd, Abu Dhabi (AE)

(72) Inventors: Deng-Ping Fan, Abu Dhabi (AE); Mingchen Zhuge, Wuhan (CN); Ling Shao, Abu Dhabi (AE)

(73) Assignee: Inception Institute of Artificial Intelligence Ltd, Abu Dhabi (AE)

(*) Notice: Subject to any disclaimer, the term of this patent is extended or adjusted under 35 U.S.C. 154(b) by 314 days.

(21) Appl. No.: 17/186,745

(22) Filed: Feb. 26, 2021

(65) Prior Publication Data
US 2022/0277218 A1 Sep. 1, 2022

(51) Int. Cl.
*G06N 20/00* (2019.01)
(52) U.S. Cl.
CPC ......... *G06N 20/00* (2019.01); *G06F 2218/12* (2023.01)
(58) Field of Classification Search
None
See application file for complete search history.

(56) References Cited

U.S. PATENT DOCUMENTS

| | | | |
|---|---|---|---|
| 11,521,263 B2* | 12/2022 | Kurz | G06Q 30/0631 |
| 2022/0237378 A1* | 7/2022 | El Asri | G06F 40/284 |
| 2022/0308848 A1* | 9/2022 | Clement | G06F 8/51 |

OTHER PUBLICATIONS

Anonymous CVPR 2021 Submission, Kaleido-BERT: Vision-Language Pre-training on Fashion Domain, 2021, 11 pages.
Anonymous CVPR 2021 Submission, Kaleido-BERT: Vision-Language Pre-training on Fashion Domain (Supplementary Materials), 2021, 13 pages.
Anonymous CVPR 2021 Submission, Repetitive Activity Counting by Sight and Sound, 2021, 9 pages.
Anonymous ICCV 2021 Submission, Sound and Sight Recognize Activity in the Dark, 2021, 11 pages.

* cited by examiner

*Primary Examiner* — Dov Popovici
(74) *Attorney, Agent, or Firm* — Stetina Brunda Garred and Brucker

(57) ABSTRACT

A transformer based vision-linguistic (VL) model and training technique uses a number of different image patches covering the same portion of an image, along with a text description of the image to train the model. The model and pre-training techniques may be used in domain specific training of the model. The model can be used for fine-grained image-text tasks in the fashion domain.

24 Claims, 8 Drawing Sheets

| Tasks | | VSE | VSE++ | SCAN | PFAN | ViLBERT | VLBERT | FashionBERT | ImageBERT | OSCAR | Current Model |
|---|---|---|---|---|---|---|---|---|---|---|---|
| 1. ITR | Rank@1 ↑ | 4.01% | 4.59% | 4.59% | 4.29% | 20.97% | 19.26% | 23.96% | 22.76% | 23.39% | 27.99% (+4.60%) |
| | Rank@5 ↑ | 11.03% | 14.99% | 16.50% | 14.90% | 40.49% | 39.90% | 46.31% | 41.89% | 44.67% | 60.09% (+13.78%) |
| | Rank@10 ↑ | 22.14% | 24.10% | 26.60% | 24.20% | 48.21% | 46.05% | 52.12% | 50.77% | 52.55% | 68.37% (+15.82%) |
| 2. TIR | Rank@1 ↑ | 4.35% | 4.60% | 4.30% | 6.20% | 21.12% | 22.63% | 26.75% | 24.78% | 25.10% | 33.88% (+7.13%) |
| | Rank@5 ↑ | 12.76% | 16.89% | 13.08% | 20.79% | 37.23% | 36.48% | 46.48% | 45.20% | 49.14% | 60.60% (+11.46%) |
| | Rank@10 ↑ | 20.91% | 28.99% | 22.30% | 31.52% | 50.11% | 48.52% | 55.74% | 55.90% | 56.68% | 68.59% (+11.91%) |
| SumR ↑ | | 75.20 | 94.16 | 87.29 | 101.90 | 218.13 | 212.84 | 251.36 | 241.30 | 251.53 | 319.52 |

FIG. 7

| Tasks | | FashionBERT | ImageBERT | OSCAR | Current Model | |
|---|---|---|---|---|---|---|
| 3.CR | ACC ↑ | 91.25% | 90.77% | 91.79% | 95.07% | (+3.28%) |
| | macro-F ↑ | 0.705 | 0.699 | 0.727 | 0.714 | (−0.013) |
| | micro-F ↑ | 0.921 | 0.919 | 0.936 | 0.951 | (+0.015) |
| 3.SUB | ACC ↑ | 85.27% | 80.11% | 84.23% | 88.07% | (+2.80%) |
| | macro-F ↑ | 0.620 | 0.575 | 0.591 | 0.636 | (+0.016) |
| | micro-F ↑ | 0.876 | 0.870 | 0.855 | 0.881 | (+0.005) |
| | Sum CLS ↑ | 488.72 | 477.18 | 486.92 | 501.34 | (+12.62) |
| 4.FC | Bleu-3 ↑ | 6.00 | - | 6.70 | 8.20 | (+1.5) |
| | Bleu-4 ↑ | 3.30 | - | 4.50 | 5.70 | (+1.2) |
| | METEOR ↑ | 9.80 | - | 10.9 | 12.8 | (+1.9) |
| | ROUGE-L ↑ | 29.7 | - | 30.1 | 32.9 | (+2.8) |
| | Sum CAP ↑ | 48.8 | - | 52.2 | 59.6 | (+7.4) |

FIG. 8

DOMAIN SPECIFIC PRE-TRAINING OF CROSS MODALITY TRANSFORMER MODEL

CROSS-REFERENCE TO RELATED APPLICATIONS

Not Applicable

STATEMENT RE: FEDERALLY SPONSORED RESEARCH/DEVELOPMENT

Not Applicable

BACKGROUND

Technical Field

The current disclosure relates to the training of use of a transformer-based model and in particular to the training and use of a cross modality transformer model for a specific domain.

Background

Transformer based models were first designed for Natural Language Processing (NLP), however have achieved great success in a number of other areas including vision (e.g., Selfie, DETR, ViT) and vision-language (VL) (e.g. ViL-BERT, VL-BERT, OSCAR) applications. For VL Pre-Training Model (PTM), current approaches, such as VL-BERT and UNITER focus on learning text and image representation of a general domain (i.e., coarse matching).

However, in the various e-commercial situations (e.g., accessories, clothing, toys), a goal is to learn the fine-grained representation (e.g. short sleeve, cotton and jersey) rather than only the coarse representation (e.g. what, where) in the general domain. In this case, the current general VL models such as UNITER and VL-BERT are sub-optimal for domain specific tasks such as fashion-based tasks, and could be unfavorable when deploying global features based models to attribute-aware tasks, such as searching for a specific fashion catalog/object.

It is desirable to have an additional, alternative and/or improved transformer based model and training method.

BRIEF SUMMARY

In accordance with the present disclosure there is provided a method of pre-training a predictive model in a fashion domain, the method comprising: receiving an input image of a fashion product and input text describing the fashion product; tokenizing the input text to generate a plurality of input text tokens; generating a plurality of patch groups of one or more image patches of the input image, each of the patch groups of one or more image patches covering a common portion of the input image; masking one or more of the image patches and the input text tokens; generating a training embedding from the image patches and the input tokens; and training a cross modality transformer-based model to predict the masked one or more image patches and input text tokens using the training embedding.

In a further embodiment of the method, the method further comprises: aligning one or more input text tokens with one or more aligned image patches based on a possible relevance of each of the input text tokens to respective ones of the aligned image patches.

In a further embodiment of the method, masking the one or more of the image patches and the input text tokens comprises: for one or more of the input text tokens aligned with one or more aligned image patches: selecting either the respective input text token or one or more of the aligned image patches aligned with the respective input text token; and masking the selected one of the respective input text token or the aligned image patches.

In a further embodiment of the method, masking the selected input text token comprises replacing the input text token with one of: a mask token; and a token of a random word.

In a further embodiment of the method, masking the selected one or more aligned image patches comprises replacing one or more of the aligned image patches with one or more of: a patch covering a similar location of a similar image; a greyed version of the aligned image patch; and a blank version of the aligned image patch.

In a further embodiment of the method, aligned image patches from a plurality of patch groups of the input image are masked.

In a further embodiment of the method, masking the one or more of the image patches and the input text tokens comprises preferentially masking the aligned one or more input text tokens and aligned image patches.

In a further embodiment of the method, aligning one or more input text tokens with one or more aligned image patches comprises: generating using a trained description model a text description of the input image, the trained description model provides an attention map for each token in the generated text description providing relevant regions of the input image that were relevant in generating the token; matching one or more tokens of the generated text description with one or more tokens of the input text; for each matched token of the input text, aligning the matched token with image patches corresponding to relevant regions of the attention map of the matched generated token.

In a further embodiment of the method, each matched token is aligned with an image patch from a plurality of patch groups.

In a further embodiment of the method, generating the training embedding comprises: generating an image embedding from the image patches; generating a text embedding from the input text tokens; and generating the training embedding by concatenating the image embedding and the text embedding.

In a further embodiment of the method, generating the image embedding comprises: adding location information and segment information to each image patch; and generating the image embedding from the location information, segment information and image patch, and wherein generating the text embedding from the input tokens comprises: adding position information and segment information to each input token; and generating the text embedding from the position information, segment information and input token.

In a further embodiment of the method, training the transformer-based model comprises minimizing an overall loss function that is a summation of a plurality of individual loss functions for respective training tasks.

In a further embodiment of the method, the training tasks and individual loss functions include one or more of: an aligned masked language modelling task that attempts to predict masked text tokens with an individual loss function, $\mathcal{L}_{AMLM}$, defined as: $\mathcal{L}_{AMLM} = \Sigma CE(t_i, \mathcal{F}(T,K,\theta)_{MSK\_hidden})$; an image and text matching task that attempts to predict if the text describes the image with an individual loss function, $\mathcal{L}_{ITM}$, defined as: $\mathcal{L}_{ITM}=\Sigma CE(y_m, \mathcal{F}(T,K,\theta)_{CLS\_hidden})$; a rotation recognition tasks that attempt to predict a rotation angle of an image patch with an individual loss, $\mathcal{L}_{RR}$, function defined as: $\mathcal{L}_{RR}=CE(y_r, \mathcal{F}(T,K,\theta)_{K^1\_hidden})$; a jigsaw puzzle solving task that attempts to predict a correct ordering of randomly ordered image patches with an individual loss function, $\mathcal{L}_{JPS}$, defined as: $\mathcal{L}_{JPS}=CE(y_j, \mathcal{F}(T,K,\theta)_{K^2\_hidden})$; a camouflage prediction task that attempts to predict an image patch that has been replaced with a corresponding image patch of a different image with an individual loss function, $\mathcal{L}_{CP}$, defined as: $\mathcal{L}_{CP}=CE(y_c, \mathcal{F}(T,K,\theta)_{K^3\_hidden})$; a grey-to-color modeling task that attempts to reconstruct color patch from a greyed image patch with an individual loss function, $\mathcal{L}_{G2CM}$, defined as: $\mathcal{L}_{G2CM}=\Sigma KLD(k_{4i}, \mathcal{F}(T,K,\theta)_{K^4\_hidden})$; and a blank-to-color modeling task that attempts to reconstruct a patch from a blank patch with an individual loss function, $\mathcal{L}_{B2CM}$, defined as: $\mathcal{L}_{B2CM}=\Sigma KLD(k_{5i}, \mathcal{F}(T,K,\theta)_{K^5\_hidden})$, where: CE denotes the cross-entropy loss; $\mathcal{F}$ is the cross modality transformer function; $\mathcal{F}(\bullet)_{MSK\_hidden}$ denotes the hidden output of masked-out tokens; $\mathcal{F}(\bullet)_{CLS\_hidden}$ denotes the hidden output of the CLS token; $\mathcal{L}(\bullet)_{Kx\_hidden}$ denotes the hidden output of the image patches for the image patch level x; T denotes the masked-out text sequence; K denotes the masked-out kaleidoscope patch sequence; $\theta$ is a rotation angle; $t_i$ is the text token that has been masked out; $y_m$ denotes the text and image match label $y_r$ denotes the rotation angle $y_j$ denotes the jigsaw permutation; $y_c$ denotes the camouflaged patch; KLD denotes the KL-divergence; and $k_{Ni}$ denotes he masked-out patch(es) of the $K_N$ kaleidoscope patches.

In accordance with the present disclosure there is further provided a non-transitory computer readable medium having stored thereon instructions, which when executed by one or more processors configure a computing system to perform a method of pre-training a predictive model in a fashion domain, the method comprising: receiving an input image of a fashion product and input text describing the fashion product; tokenizing the input text to generate a plurality of input text tokens; generating a plurality of patch groups of one or more image patches of the input image, each of the patch groups of one or more image patches covering a common portion of the input image; masking one or more of the image patches and the input text tokens; generating a training embedding from the image patches and the input tokens; training a cross modality transformer-based model to predict the masked one or more image patches and input text tokens using the training embedding.

In a further embodiment of the non-transitory computer readable medium, the method further comprises: aligning one or more input text tokens with one or more aligned image patches based on a possible relevance of each of the input text tokens to respective ones of the aligned image patches.

In a further embodiment of the non-transitory computer readable medium, masking the one or more of the image patches and the input text tokens comprises: for one or more of the input text tokens aligned with one or more aligned image patches: selecting either the respective input text token or one or more of the aligned image patches aligned with the respective input text token; and masking the selected one of the respective input text token or the aligned image patches.

In a further embodiment of the non-transitory computer readable medium, masking the selected input text token comprises replacing the input text token with one of: a mask token; and a token of a random word.

In a further embodiment of the non-transitory computer readable medium, masking the selected one or more aligned image patches comprises replacing one or more of the aligned image patches with one or more of: a patch covering a similar location of a similar image; a greyed version of the aligned image patch; and a blank version of the aligned image patch.

In a further embodiment of the non-transitory computer readable medium, aligned image patches from a plurality of patch groups of the input image are masked.

In a further embodiment of the non-transitory computer readable medium, masking the one or more of the image patches and the input text tokens comprises preferentially masking the aligned one or more input text tokens and aligned image patches.

In a further embodiment of the non-transitory computer readable medium, aligning one or more input text tokens with one or more aligned image patches comprises: generating using a trained description model a text description of the input image, the trained description model provides an attention map for each token in the generated text description providing relevant regions of the input image that were relevant in generating the token; matching one or more tokens of the generated text description with one or more tokens of the input text; for each matched token of the input text, aligning the matched token with image patches corresponding to relevant regions of the attention map of the matched generated token.

In a further embodiment of the non-transitory computer readable medium, each matched token is aligned with an image patch from a plurality of patch groups.

In a further embodiment of the non-transitory computer readable medium, generating the training embedding comprises: generating an image embedding from the image patches; generating a text embedding from the input text tokens; and generating the training embedding by concatenating the image embedding and the text embedding.

In a further embodiment of the non-transitory computer readable medium, generating the image embedding comprises: adding location information and segment information to each image patch; and generating the image embedding from the location information, segment information and image patch, and wherein generating the text embedding from the input tokens comprises: adding position information and segment information to each input token; and generating the text embedding from the position information, segment information and input token.

In a further embodiment of the non-transitory computer readable medium, training the transformer-based model comprises minimizing an overall loss function that is a summation of a plurality of individual loss functions for respective training tasks.

In a further embodiment of the non-transitory computer readable medium, the training tasks and individual loss functions include one or more of: an aligned masked language modelling task that attempts to predict masked text tokens with an individual loss function, $\mathcal{L}_{AMLM}$, defined as: $\mathcal{L}_{AMLM}=\Sigma CE(t_i, \mathcal{F}(T,K,\theta)_{MSK\_hidden})$; an image and text matching task that attempts to predict if the text describes the image with an individual loss function, $\mathcal{L}_{ITM}$, defined as: $\mathcal{L}_{ITM}=\Sigma CE(y_m, \mathcal{F}(T,K,\theta)_{CLS\_hidden})$; a rotation recognition tasks that attempt to predict a rortation angle of an image patch with an individual loss, $\mathcal{L}_{RR}$, function defined as: $\mathcal{L}_{RR}=CE(y_r, \mathcal{F}(T,K,\theta)_{K^1\_hidden})$; a jigsaw puzzle solving task that attempts to predict a correct ordering of randomly ordered image patches with an individual loss function, $\mathcal{L}_{JPS}$, defined as: $\mathcal{L}_{JPS}=CE(y_j, \mathcal{F}(T,K,\theta)_{K^2\_hidden})$; a camouflage prediction task that attempts to predict an image patch that has been replaced with a corresponding image patch of a different image with an individual loss function, $\mathcal{L}_{CP}$, defined as: $\mathcal{L}_{CP}=CI(y_c, \mathcal{F}(T,K,\theta)_{K^3\_hidden})$; a grey-to-color modeling task that attempts to reconstruct color patch from a greyed image patch with an individual loss function, $\mathcal{L}_{G2CM}$, defined as: $\mathcal{L}_{G2CM}=\Sigma KLD(k_{4i}, \mathcal{F}(T,K,\theta)_{K^4\_hidden})$; and a blank-to-color modeling task that attempts to reconstruct a patch from a blank patch with an individual loss function, $\mathcal{L}_{B2CM}$, defined as: $\mathcal{L}_{B2CM}=\Sigma KLD(k_{5i}, \mathcal{F}(T,K,\theta)_{K^5\_hidden})$, where: CE denotes the cross-entropy loss; $\mathcal{F}$ is the cross modality transformer function; $\mathcal{F}(\bullet)_{MSK\_hidden}$ denotes the hidden output of masked-out tokens; $\mathcal{F}(\bullet)_{CLS\_hidden}$ denotes the hidden output of the CLS token; $\mathcal{F}(\bullet)_{Kx\_hidden}$ denotes the hidden output of the image patches for the image patch level x; T denotes the masked-out text sequence; K denotes the masked-out kaleidoscope patch sequence; $\theta$ is a rotation angle; $t_i$ is the text token that has been masked out; $y_m$ denotes the text and image match label $y_r$ denotes the rotation angle $y_j$ denotes the jigsaw permutation; $y_c$ denotes the camouflaged patch; KLD denotes the KL-divergence; and $k_{Ni}$ denotes he masked-out patch(es) of the $K_N$ kaleidoscope patches.

In accordance with the present disclosure there is further provided a computer system comprising: a processor for executing instructions; a memory storing instructions, which when executed by the processor configure the computer system to perform a method of pre-training a predictive model in a fashion domain, the method comprising: receiving an input image of a fashion product and input text describing the fashion product; tokenizing the input text to generate a plurality of input text tokens; generating a plurality of patch groups of one or more image patches of the input image, each of the patch groups of one or more image patches covering a common portion of the input image; masking one or more of the image patches and the input text tokens; generating a training embedding from the image patches and the input tokens; and training a cross modality transformer-based model to predict the masked one or more image patches and input text tokens using the training embedding.

In a further embodiment of the computer system, the method further comprises: aligning one or more input text tokens with one or more aligned image patches based on a possible relevance of each of the input text tokens to respective ones of the aligned image patches.

In a further embodiment of the computer system, masking the one or more of the image patches and the input text tokens comprises: for one or more of the input text tokens aligned with one or more aligned image patches: selecting either the respective input text token or one or more of the aligned image patches aligned with the respective input text token; and masking the selected one of the respective input text token or the aligned image patches.

In a further embodiment of the computer system, masking the selected input text token comprises replacing the input text token with one of: a mask token; and a token of a random word.

In a further embodiment of the computer system, masking the selected one or more aligned image patches comprises replacing one or more of the aligned image patches with one or more of: a patch covering a similar location of a similar image; a greyed version of the aligned image patch; and a blank version of the aligned image patch.

In a further embodiment of the computer system, aligned image patches from a plurality of patch groups of the input image are masked.

In a further embodiment of the computer system, masking the one or more of the image patches and the input text tokens comprises preferentially masking the aligned one or more input text tokens and aligned image patches.

In a further embodiment of the computer system, aligning one or more input text tokens with one or more aligned image patches comprises: generating using a trained description model a text description of the input image, the trained description model provides an attention map for each token in the generated text description providing relevant regions of the input image that were relevant in generating the token; matching one or more tokens of the generated text description with one or more tokens of the input text; for each matched token of the input text, aligning the matched token with image patches corresponding to relevant regions of the attention map of the matched generated token.

In a further embodiment of the computer system, each matched token is aligned with an image patch from a plurality of patch groups.

In a further embodiment of the computer system, generating the training embedding comprises: generating an image embedding from the image patches; generating a text embedding from the input text tokens; and generating the training embedding by concatenating the image embedding and the text embedding.

In a further embodiment of the computer system, generating the image embedding comprises: adding location information and segment information to each image patch; and generating the image embedding from the location information, segment information and image patch, and wherein generating the text embedding from the input tokens comprises: adding position information and segment information to each input token; and generating the text embedding from the position information, segment information and input token.

In a further embodiment of the computer system, training the transformer-based model comprises minimizing an overall loss function that is a summation of a plurality of individual loss functions for respective training tasks.

In a further embodiment of the computer system, the training tasks and individual loss functions include one or more of: an aligned masked language modelling task that attempts to predict masked text tokens with an individual loss function, $\mathcal{L}_{AMLM}$, defined as: $\mathcal{L}_{AMLM}=\Sigma CE(t_i, \mathcal{F}(T,K,\theta)_{MSK\_hidden})$; an image and text matching task that attempts to predict if the text describes the image with an individual loss function, $\mathcal{L}_{ITM}$, defined as: $\mathcal{L}_{ITM}=\Sigma CE(y_m, \mathcal{F}(T,K,\theta)_{CLS\_hidden})$; a rotation recognition tasks that attempt to predict a rortation angle of an image patch with an individual loss, $\mathcal{L}_{RR}$, function defined as: $\mathcal{L}_{RR}=CE(y_r, \mathcal{F}(T,K,\theta)_{K^1\_hidden})$; a jigsaw puzzle solving task that attempts to predict a correct ordering of randomly ordered image patches with an individual loss function, $\mathcal{L}_{JPS}$, defined as: $\mathcal{L}_{JPS}=CE(y_j, \mathcal{F}(T,K,\theta)_{K^2\_hidden})$; a camouflage prediction task that attempts to predict an image patch that has been replaced with a corresponding image patch of a different image with an individual loss function, $\mathcal{L}_{CP}$, defined as: $\mathcal{L}_{CP}=CE(y_c, \mathcal{F}(T,K,\theta)_{K^3\_hidden}$; a grey-to-color modeling task that attempts to reconstruct color patch from a greyed image patch with an individual loss function, $\mathcal{L}_{G2CM}$, defined as: $\mathcal{L}_{G2CM}=\Sigma KLD(k_{4i}, \mathcal{F}(T,K,\theta)_{K^4\_hidden}$; and a blank-to-color modeling task that attempts to reconstruct a patch from a blank patch with an individual loss function, $\mathcal{L}_{B2CM}$, defined as: $\mathcal{L}_{B2CM}=\Sigma KLD(k_{5i}, \mathcal{F}(T,K,\theta)_{K^5\_hidden}$, where: CE denotes the cross-entropy loss; $\mathcal{F}$ is the cross modality transformer function; $\mathcal{F}(\bullet)_{MSK\_hidden}$ denotes the hidden output of masked-out tokens; $\mathcal{F}(\bullet)_{CLS\_hidden}$ denotes the hidden output of the CLS token; $\mathcal{F}(\bullet)_{Kx\_hidden}$ denotes the hidden output of the image patches for the image patch level x; T denotes the masked-out text sequence; K denotes the masked-out kaleidoscope patch sequence; θ is a rotation angle; $t_i$ is the text token that has been masked out; $y_m$ denotes the text and image match label $y_r$ denotes the rotation angle $y_j$ denotes the jigsaw permutation; $y_c$ denotes the camouflaged patch; KLD denotes the KL-divergence; and $k_{Ni}$ denotes he masked-out patch(es) of the $K_N$ kaleidoscope patches.

BRIEF DESCRIPTION OF THE DRAWINGS

Further features and advantages of the present disclosure will become apparent from the following detailed description, taken in combination with the appended drawings, in which:

FIG. 7 details the retrieval performances of different models on the Fashion-Gen dataset; and FIG. 8 details the category recognition and fashion captioning performances of different models on the Fashion-Gen dataset.

DETAILED DESCRIPTION

Figure 1:
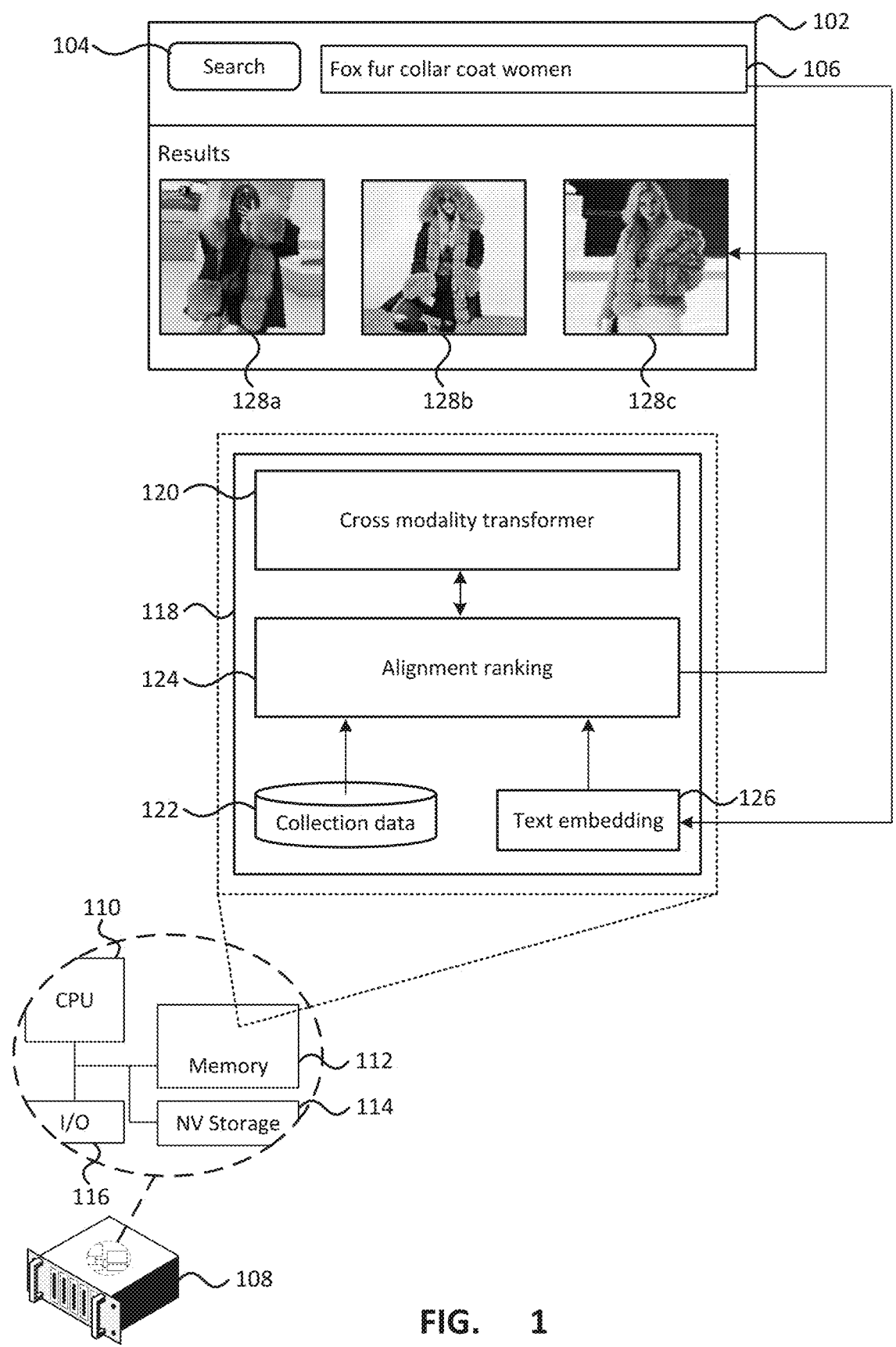
FIG. 1 depicts an application of a domain specific transformer-based model.

Existing vision-linguistic (VL) models mainly focus on relatively coarse representations, while less attention has been paid to fine-grained representation learning for domain-specific tasks such as fashion-based tasks. A domain-specific transformer-based model can be pre-trained using a multi-modal approach for fine-grained representation learning tasks. The model and pre-training approach are applied to the fashion domain and trained on both fashion related images and associated descriptions. The model uses fine-grained image patches when generating image embeddings. When pre-training the model, image patches and relevant text tokens are aligned with each other and then an alignment guided masking approach is used to preferentially mask one of an image patch or text token that were aligned. Once pre-training is completed the model can be used in various applications, including for example retrieving images/products based on a text description.

Image-text pair models can be categorized into single stream, two-stream or even three-stream models according to the network architecture of the single-modal input. In single-stream models, the features of different modalities are directly fed into a Transformer. In contrast, in two-stream models, they are first processed by two single-modal networks before fed into a Transformer, and so forth in three-stream models. While single stream, two-stream and three-stream models may have associated advantages or disadvantages, single-stream models may provide more cross-modality information interactions.

The transformer-based model described further herein is a single-stream model based on the BERT (Bidirectional Encoder Representations from Transformers) framework. The model focuses on a masking strategy at the embedding level rather than at the task level or input level. The current pre-training approach explicitly aligns the embedding features between image and text so that it can learn fine-grain representations for domain-specific tasks, such as fashion tasks. The pre-training of the model focuses on fine-grained representation learning and bridging the semantic gaps between text and image. To achieve this goal, a "kaleidoscope" patch strategy is developed for images, which extracts a kaleidoscope of multi-grained image patches for the image-modality. This strategy is scalable and largely alleviates the coarse presentation issue of generic models by introducing a patch-variant pre-training scheme. Furthermore, to bridge the semantic gap between different modalities, attention information is employed to build pre-alignments between kaleidoscope patches of the images and text tokens. This pre-alignment information further guides the masking strategy for pre-training the model. The pre-training forces the model to explicitly learn semantic information across modalities.

The pre-training of the model described herein uses a kaleidoscope patch generate a kaleidoscope of multi-grained patches and corresponding features from images. Related pre-training tasks for the kaleidoscope patches cause the model to learn fine-grained cross-modality information. The kaleidoscope patch based training outperforms other fixed-patch vision-linguistic (VL) models in the fashion domain. A pre-alignment strategy is introduced to infer a cross-modality mapping between kaleidoscope patches and text tokens. The pre-alignment attempts to align image patches with related text tokens. These pre-alignment pairs largely fill the semantic gaps between modalities. The pre-training uses the pre-alignment pairs are then used in an alignment-guided strategy. The alignment-guided masking strategy explicitly forces the model to learn the semantic connections between vision and language, that is between the image modality and text modality.

The model and pre-training described herein obtains new state-of-the-art performance on four downstream tasks of (i) image-text retrieval, (ii) text-image retrieval, (iii) category recognition, and (iv) fashion captioning. The model also achieves the 1st place on the public Fashion-Gen benchmark.

FIG. 1 depicts an application of a domain specific transformer-based model. As depicted, the application is depicted as a fashion product search system or interface 102 that allows a user to search for various items. The system allows a user to enter search terms describing a desired product and returns product images based on the search terms. The interface 102 may include a search button 104 and text box 106 that allows a text string to be input and used to search for fashion related products. The interface 102 may be provided by one or more computers 108. The computer system 108 comprises a processor (CPU) 110 for executing instructions that may be stored in a memory unit 112. The computer system 108 may further include non-volatile (NV) storage 114 for storage of instructions and data. An input/output (I/O) interface 116 may allow additional components, such as mice, keyboards, displays, network interfaces, graphics processing units, etc., to be connected to the system 108.

The instructions stored in memory 112 may be executed by the CPU 110 in order to configure the system 108 to provide functionality 118 for the fashion product search interface 102. The functionality 118 includes a cross modality transformer based model 120 that has been trained on fashion related data. The trained model 120 may be used to process and catalogue a plurality of products/images to provide model data for the collection of fashion products/images 122. The collection data 122 may comprise for example image embeddings of product images that were previously generated by the trained cross modality transformer model 120, or at least the image embedding portion of the trained model. Alignment ranking functionality 124 may process text embeddings generated by text embedding functionality 126 using the cross modality transformer model 120 in order to rank collection data 122 to determine products/images that match the text embeddings. In use, the text embedding of the search text can be combined with different product image embeddings from the collection data 122 in order to determine or rank the product images that are best described by the search text. The top ranked results 128a, 128b, 128c may then be returned for display to the interface 102.

Figure 2:
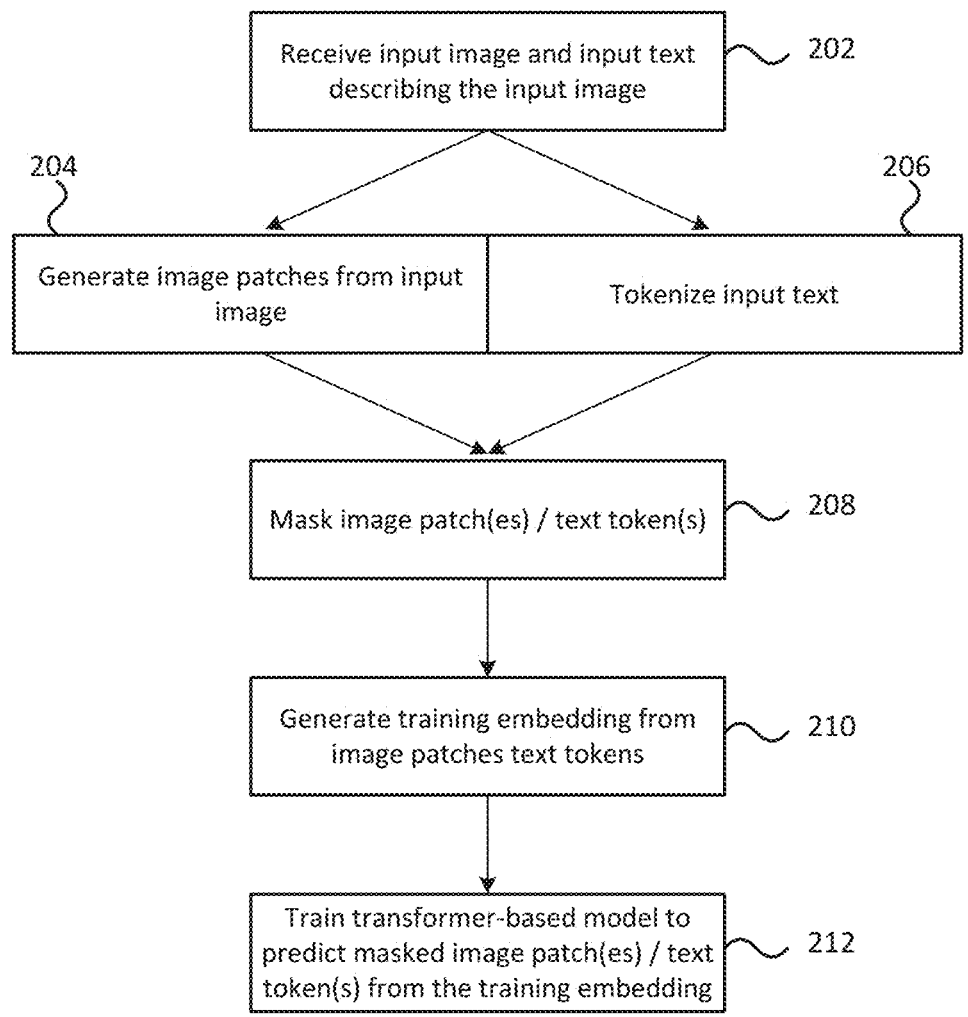
FIG. 2 depicts a method of training a domain specific transformer-based model.

FIG. 2 depicts a method of training, or pre-training, a domain specific transformer-based model. The method 200 receives an input image and input text describing the input image (202). The input image may be an image of one or more fashion related products and the input text can describe the fashion related products. The input image is processed to generate image patches from the input image (204). The patches can be generated at differing levels of granularity so that the image or portion of the image is represented by a plurality of different patch groups. Each of the patch groups covers the same portion of the input image but with varying numbers of patches. For example, in the first level patch group the image may be covered by a single patch, while in the second level patch group the image may be covered by a 2×2 grid of patches, and in the $n^{th}$ level patch group the image may be covered by an n×n grid of patches. The model described below uses 5 different levels for the kaleidoscope patches, with each level being covered by a grid of patches. Generating the kaleidoscope patches using the 5 level grid process results in 55 individual patches. In addition to generating the kaleidoscope patches from the input images, the method 200 also tokenizes the input text (206). The input text may be tokenized into words or subwords. For example, the text tokenization may use, Byte-Pair Encoding (BPE), Unigram, WordPiece, SentencePiece or other text tokenizers.

One or more of the image patches and text tokens may be masked. As described in further detail below, the masking may preferentially mask one of a patch or text token from a patch/text pair that has been aligned. The masking may replace the image patch with a masked version of the patch or may replace a text token with a mask token or other text token. The image patches and tokens, including the masked patches/tokens are then used to generate a training embedding (210). The training embedding may be generated as a concatenation of embeddings of individual patches image patches and text tokens. The image and text embeddings may be generated using respective embedding functionality. The training embedding is then used to train the transformer-based model (212) by applying the model to the training embedding in order to predict the masked image patches/tokens. The prediction results compared to the actual image patches/text tokens that were masked are used to adjust the model in order to reduce the error between the predicted image patches/text tokens and the patches/tokens that were masked.

Figure 3:
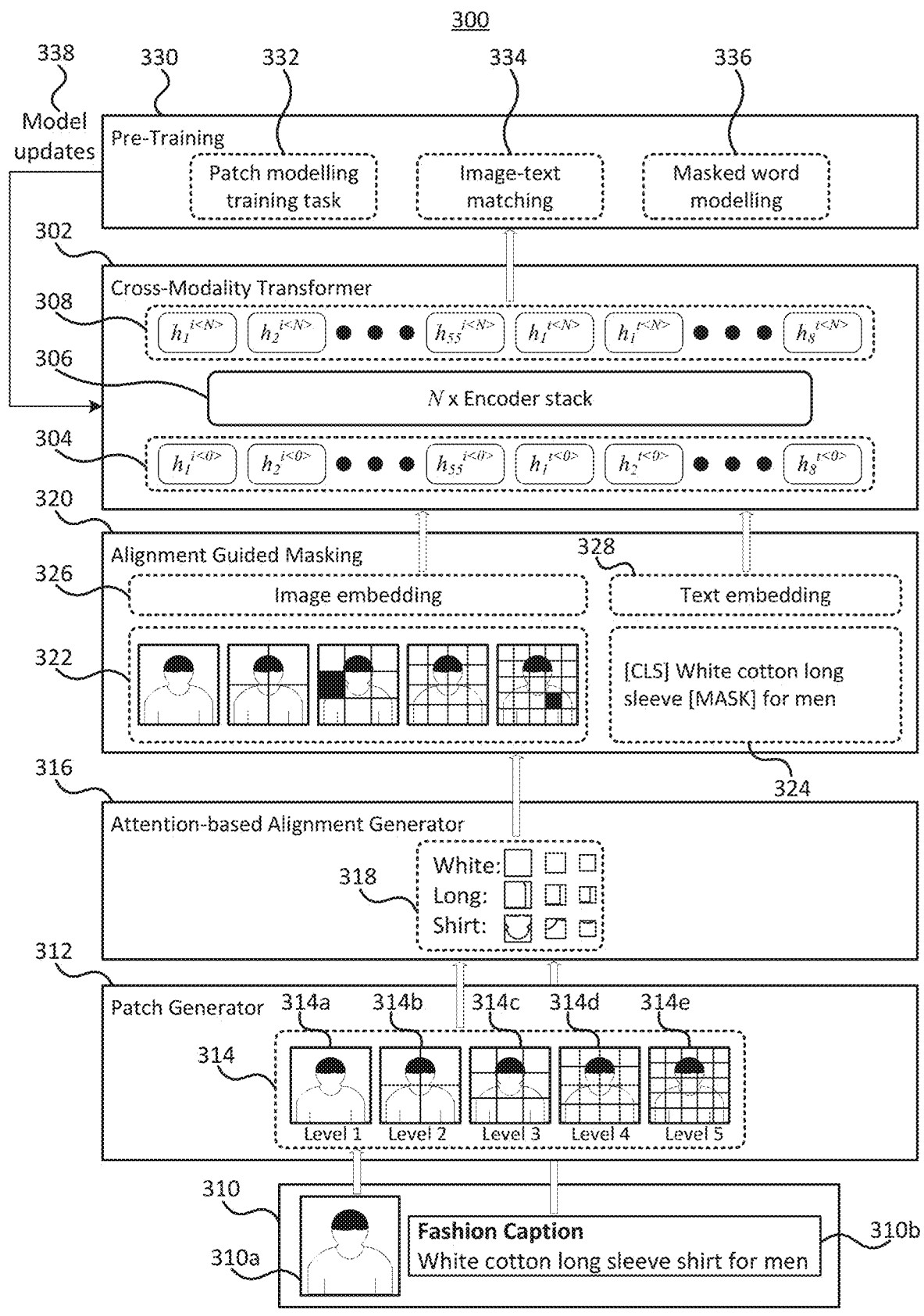
FIG. 3 depicts a training system for a domain specific transformer-based model.

FIG. 3 depicts a training system for a domain specific transformer-based model. The training system 300 causes the cross modality transformer to learn the fine-grained VL features for the fashion domain rather than the coarse representation features for general VL tasks. The standard transformer designed for natural language processing (NLP), namely the bidirectional encoder representations from transformers (BERT), is adopted to make the cross modality model scalable over a varying number of transformer-based VL learning tasks.

The pre-training system trains the cross-modality transformer-based model 302. As depicted, the model 302 receives an input embedding 304 which is processed by a stack of N encoders 306 with each encoder outputting an encoding that is processed by the next encoder and finally outputs a result embedding 308.

The pre-training system 300 receives an input 310 comprising an input image 310a and corresponding text description 310b. The input image 310a is processed by a patch generator 312. The patch generator 312 receives the input image 310a and generates a number of image patches 314. The patches are generated as a number of different levels of patch groups 314a, 314b, 314c, 314d, 314e. The patches of each patch group cover the same portion of the image with different numbers of patches. The patches of each group may be arranged in a grid or matrix. For example, the level 1 patch group 314a may cover the image with a single patch, the level 2 patch group 314b may cover the same image with 4 patches arranged in a 2×2 grid, the level 3 patch group 314c may cover the same image with 9 patches arranged in a 3×3 grid, the level 4 patch group 314d may cover the same image with 16 patches arranged in a 4×4 grid and the level 5 patch group 314e may cover the same image with 25 patches arranged in a 5×5 grid. In the 5-level patch group depicted in FIG. 3 there are 55 total image patches generated. Although 5 patch group levels are depicted in FIG. 3 it will be appreciated that additional group levels may be used, or possibly fewer group levels.

The image patches 314 and the input text 310b may be provided to an attention-based alignment generator 316 that attempts to generate alignment pairs 318 between image patches and text tokens of the input text 310b. An image patch may be aligned to a text token if the image patch is relevant to the text token. Not all text tokens may be aligned with an image patch. Although the alignment pairs may be generated in various ways, one approach is to use a separate model to automatically generate a text description of the image along with a mapping of areas in the image that were important in generating the respective text tokens. One or more of the automatically generated text tokens can be matched to corresponding tokens from the input text and the mapping of the relevant images can be used to align image patches to the text tokens.

As depicted, the alignment pairs 318 may align input text tokens to an image patch from one or more of the patch groups. For example, an input text token may be aligned with a patch from each of the level 3 group, level 4 group and level 5 group. While it would be possible to generate alignment pairs from patches at lower group levels the individual patches in lower levels may be too large. The alignment pairs 318, the input image 310a, and input text 310b may be passed to alignment guided masking functionality 320 for masking one or more of the image patches and text tokens.

The alignment guided masking functionality 320 uses the image/text alignment pairs to generate masked image patches 322 and masked input text. The masked image patches 322 comprise original image patches and one or more individual masked image patches. The individual masked image patches may replace the original image patches in various ways, although they are depicted as being replaced with a blank or black patch. Further, although depicted as replacing the actual image patches, the image patches may be provided by embeddings of the image patches. The masked text 324 may comprise the input text tokens with one or more of the text tokens replaced with a masking token, depicted as '[MASK]' in FIG. 3 or other tokens, such as a blank token or random token. In addition to the input text tokens and masked text tokens, the masked text 324 may include a classification token, depicted as '[CLS]' in FIG. 3. The classification token may be used to provide an indication of the relevance between the input text and the input image. The masked image patches 322 and masked text 324 are used to generate an image embedding 326 and text embedding 328 that can be concatenated together and provided to the cross-modality transformer 302. The embedding generated for each patch may comprise for example a feature vector having a fixed number of dimensions, such as 1024 or 2048 or other dimensions. Additional information may be included in the embeddings such as modality information indicative of whether the embedding is an image embedding or text embedding. Additionally, the information may provide an indication of the patch location for image patches, or the word position of tokens in the input text.

The embeddings are passed to the cross-modality transformer-based model 302 and used by pre-training functionality 330. The pre-training functionality 330 may include various training tasks including for example a patch modelling training task 332, an image-text matching task 334 and masked word modeling functionality 336. The pre-training tasks are used to generate model updates 338 that are used to update the cross-modality transformer model 302 and continue with the training.

The pre-training of the model 302 takes two inputs: a text (e.g., image caption or description) and corresponding image patches arranged in different patch groups. Each text may be represented as a sequence of tokens and each input image may represented as a sequence of kaleidoscope image patches. At the embedding stage, an attention-based alignment generator (AAG) may be used to generate pre-alignments between text tokens and kaleidoscope image patches so that the image and text are explicitly aligned semantically. An Alignment Guided Masking (AGM) strategy may be used to relieve the difficulty of cross-modality modeling. The AGM strategy masks respective ones of image patches or text tokens from pre-alignment pairs. Text tokens and kaleidoscope image patches can fully interact in the pre-training system 300, which gradually learns VL semantic information and produces the cross-modality fine-grained representations. The text tokens and image patches are trained under different training tasks, including image-text matching that attempts to predict if the text describes the image, an aligned masked language modeling task that attempts to predict the masked out words based on the surrounding words and image patches, as well as aligned kaleidoscope patch modeling task that attempts to predict different image patches.

Figure 4:
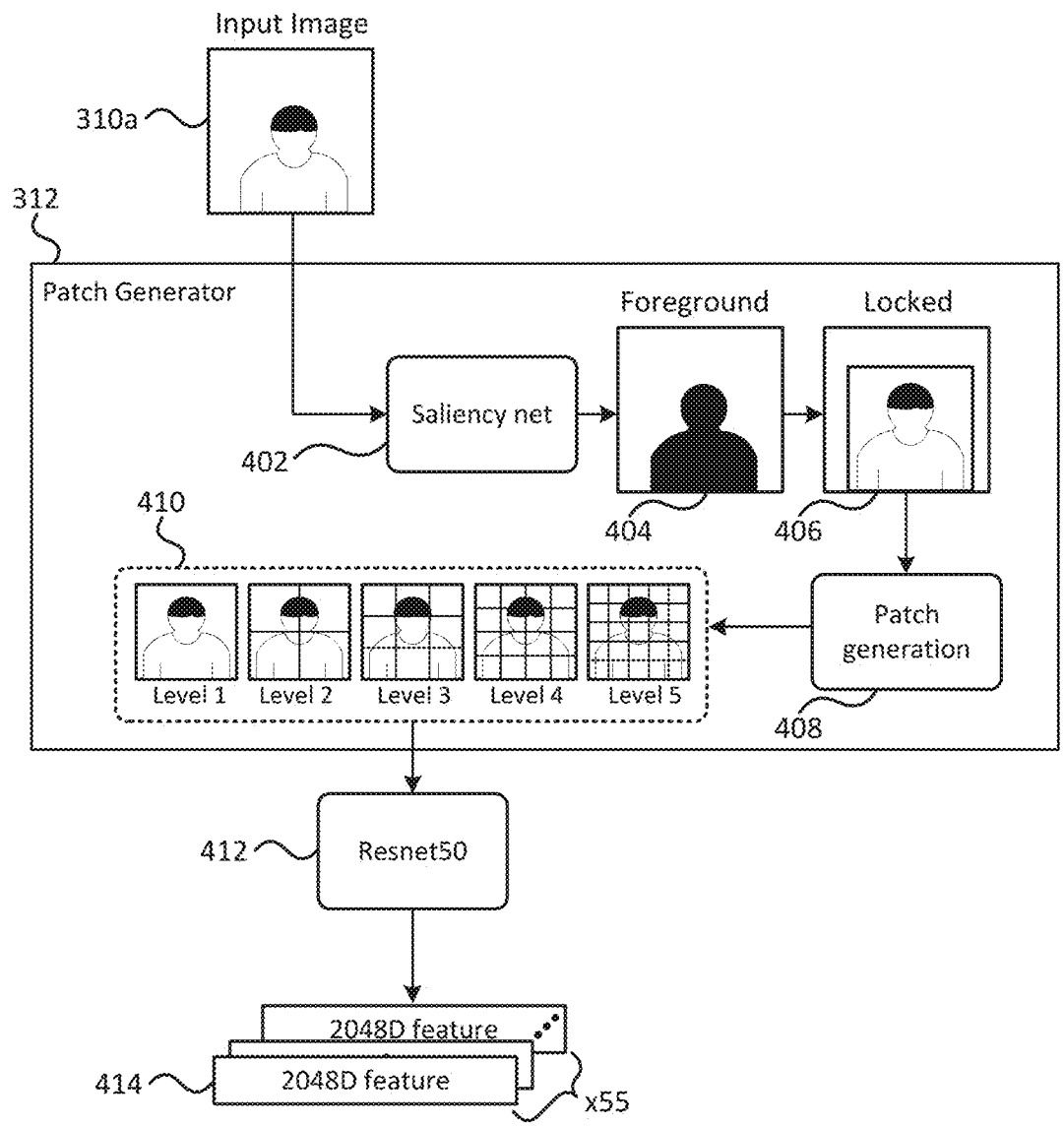
FIG. 4 depicts components of a patch generator for use in a training system as depicted in FIG. 3.

FIG. 4 depicts components of a patch generator for use in a training system as depicted in FIG. 3. As depicted, the patch generator 312 may receive an image 310a as input, which is passed to a saliency detection network 402, such as EGNet, that can identify the foreground 404 of the input image. With the foreground identified it can be used to lock, or provide a bounding box around, the relevant portion 406 of the input image. From the locked portion, patch generation functionality 408 generates a plurality of image patches 410. As depicted the image patches are generated in a number of different patch groups with each patch group covering the locked image with different numbers of patches. The patch generation splits the image into different scales (i.e., 1×1, 2×2, . . . , 5×5), with the different scales of patches providing the "kaleidoscope" patches. More detailed divisions, such as 6×6 or N×N may be used according to the difficulty of the specific task. In the case of 5 different scales of the image patches, and using 1×1, 2×2, 3×3, 4×4, and 5×5 patch grids for each level 55 kaleidoscope patches are obtained from each input image. Once the image patches are generated, they may be used to generate the image embeddings of these patches, for example using a standard ResNet-50 412 as the embedding backbone. As depicted, the ResNet-50 can produce a 2048 dimension feature vector 414 for each of the 55 image patches.

Figure 5:
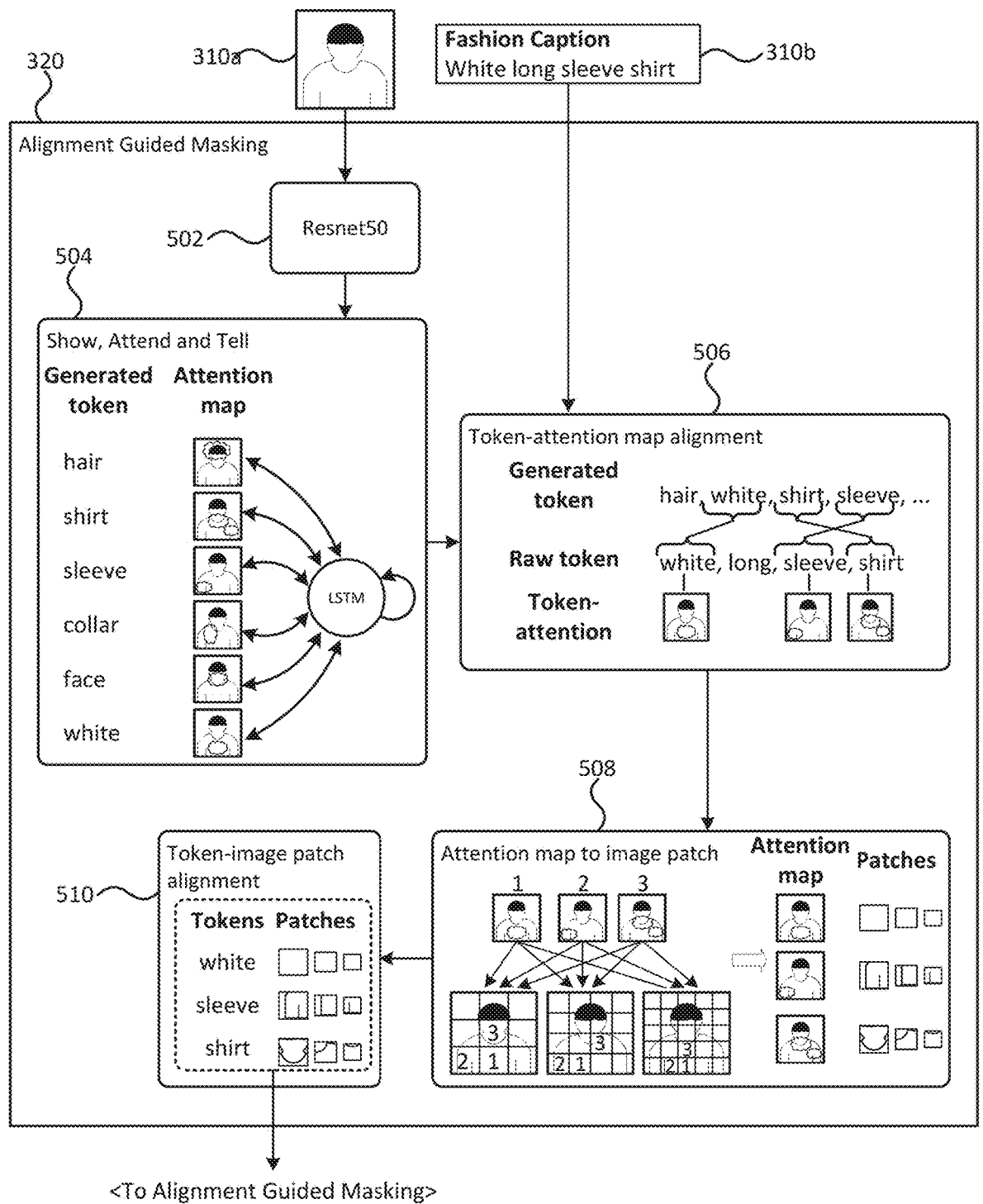
FIG. 5 depicts components of alignment guided masking functionality for use in a training system as depicted in FIG. 3.

FIG. 5 depicts components of alignment guided masking functionality for use in a training system as depicted in FIG. 3. The alignment guided masking functionality 320 receives the input image 310a, or the image patches, as well as the input text 310b and attempts to align image patches with respective text tokens. In order to find the coarse alignments between text tokens and kaleidoscope patches, a text description of the image is automatically generated along with a map of portions of the image that contributed to each generated token. The generated tokens and the associated image relevancy map can then be matched to input tokens and the relevancy map aligned to image patches.

Features can be generated for the image, for example using ResNet50 502. The features can be passed to a Show, Attend and Tell (SAT) network 504 that uses long short term memory model to generate text tokens and attention maps for each of the generated tokens. The attention map provides a heat map for each token indicating portions of the image that were relied upon in generating the token. The attention maps can be used to infer the regions of an image that the text token relates to or describes.

The generated tokens and associated attention maps are used by token-attention map alignment functionality 506 in order to match attention maps to the raw input tokens. Tokens in the generated tokens are matched to input tokens in order to align the attention maps to input tokens. It will be appreciated that not all of the generated tokens will match input tokens, and likewise, not all of the input tokens will match generated tokens.

Attention map to image patch alignment functionality 508 determines image patches corresponding to relevant areas in the attention map. As previously described, a plurality of patch groups are generated at different levels or scales. The image patches matching particular regions of the attention maps are determined for fine grained patch groups. As depicted, an image patch from each of the patch groups using 3×3 patch grid, 4×4 patch grid, and 5×5 patch grid are aligned to regions of the attention map, although patches from other patch groups may be aligned as well. As depicted, each of the attention maps are mapped to a respective image patch at three different patch group levels.

The image patches associated with the attention maps are then aligned to the text tokens by token-image patch alignment functionality 510. Image patches are associated with attention maps, which in turn are associated with text tokens, which allows the image patches to be associated with the respective text tokens. With the text tokens and image patches aligned they can be used in alignment guided masking of the image patches and text tokens.

The random masking strategy used by other VL BERT models is that the pre-aligned (token, patch) pair provides explicit semantic relations between the two modalities. This alignment can be used in the pre-training stage, which further forces the current transformer-based model to explicitly explore cross-modality semantic information. In contrast to the random masking strategy, Alignment Guided Masking (AGM) gives high priority to masking the pre-alignment pairs. Meanwhile, for each selected pre-aligned (token, patch) pair, either the token part or the patch part of the pre-alignment pair is randomly masked, which stimulates the model to learn the missing information in one modality using the information of the other. If all pre-alignment pairs are traversed and masked but not-enough tokens or patches have been masked, a random masking strategy is adopted to mask the unaligned tokens and patches independently. In this way, it is possible to obtain the token and patch masking candidates. The AGM strategy is not applied to all of the patch groups, since the masking of large patches, such as the 1×1 patch groups or 2×2 patch groups will increase the difficulty of the modelling. The AGM strategy may be applied to finer-grained patch groups such as the 3×3 patch group, 4×4 patch group and 5×5 patch group. The AGM strategy may mask different numbers of image patches at each group level. For example one image patch may be masked for the level 3, or 3×3, patch group, two image patches may be masked for the level 4, or 4×4, patch group and three image patches may be masked for the level 5 or 5×5, patch group.

For each image patch or text token selected for masking, the patch or token may be masked in different ways. For example, an image patch may be masked by replacing the patch's image feature vector with a blank image feature vector, the image feature vector of a grey-scale version of the image patch, or the image feature vector of the same patch location of a different image. For text tokens to be masked, the token may be replaced with a masking token such as '[MASK]', and random token, or a blank token.

Once the image patches and text tokens have been masked, the image patches and tokens can be used to train the cross-modality transformer based model. Although the above has described that the masking strategy is not applied to the level 1 or level 2 group patches, these groups may nonetheless be modified for training. For example, the level one patch group, which is essentially the input image, may be rotated by one of a number of rotation angles such as 0, 90, 180, 270 or 360 degrees. The level 2 group patches may be modified by re-ordering the location of the image patches. The image patches and text tokens are processed by the cross-modality transformer model on a number of pre-training tasks.

The original BERT may be adopted as the cross-modality transformer so that the current model can be easily extended. Specifically, for the text side, the order of the text token generated via WordPieces or other tokenizers can encode the position as 0, 1, 2, 3, . . . , N based on the position of the token in the input text. The final training corpus for each sub-word token is obtained by summing up its embedding with the segment, which is used to indicate that it is part of the text or image modalities, and position embeddings, followed by another layer normalization (LN) layer. For the image side, the position information for each patch may be generated by re-organizing it as 5D features ([x1, x2, y1, y2, w*h]) for each patch. After that, both patches and location features are fed into a fully-connected (FC) layer in order to project them into the same embedding space. The visual embeddings for each patch may be obtained by summing up three FC outputs, namely the FC (segment id), FC (image patch feature), FC (position embedding) and then passing them through a LN layer. The segment id provides an indication of whether the feature belongs to the image or text modality.

To alleviate the VL semantic gap and boost feature representation, a number of pre-training tasks may be used to train the transformer based model. Three pre-training tasks are descried further below including an Aligned Masked Language Modeling (AMLM) task that attempts to predict masked words based on the observation of surrounding tokens and image patches, an Image and Text Matching (ITM) task that attempts to predict whether the text description matches the image and Aligned Kaleidoscope Patch Modeling (AKPM) task, which as described further below comprises five sub-tasks that attempts to predict the original image patches.

The AMLM pre-training task is derived from the alignment guided masking strategy. For AMLM, mask candidates, including both token and image patch candidates can be determined from the alignment guided masking. When masking indices or candidates are determined, the masking word candidates may be masked with 10% random words, 10% unchanged, and 80% [MASK] tokens. The masked-out token sequence may denoted by $T_i = \{t_1, \ldots, [MSK], \ldots, t_T\}$, where token $t_i$ is masked out. Once processed by the model, the hidden output of the last layer of the masked-out token is fed into a classifier over the standard BERT vocabularies. The AMLM goal is to predict the masked words based on the observation of their surrounding tokens and image patches. The objective of the AMLM task may be mathematically written as:

$$\mathcal{L}_{AMLM} = \Sigma CE(t_i, \mathcal{F}(T, K, \theta)_{MSK\_hidden}, \quad (1)$$

where CE denotes the cross-entropy loss. $\mathcal{F}$ is the cross-modality transformer function function. $\mathcal{F}(\bullet)_{MSK\_hidden}$ denotes the hidden output of masked-out tokens. T denotes the masked-out text sequence, K denotes the masked-out kaleidoscope patch sequence and $\theta$ is a rotation angle.

The ITM pre-training task is based on the Next Sentence Prediction (NSP) of the standard BERT. In this task, [CLS] is used to indicate the beginning of the fused representation. The hidden output of [CLS] is fed into an FC layer and a sigmoid function may be used to predict a score between 0 and 1. The text and image of positive examples are extracted from the same fashion product and description so that the image and text description match, while those of one negative sample are randomly extracted from different fashion products such that the image and text description don't match, or at least are likely not to match. The objective of the ITM task may be written mathematically as:

$$\mathcal{L}_{ITM} = \Sigma CE(y_m, \mathcal{F}(T, K, \theta)_{CLS\_hidden}, \quad (2)$$

where $y_m$ denotes the text and image match label.

The AKPM pre-training task comprises a number of sub-tasks. The kaleidoscope patch sequence is composed of a collection of kaleidoscope patches as $\{K_1, K_2, \ldots, K_N\}$, in which N is the kaleidoscope level (N=5 in the current example). The AKPM includes N sub-tasks for each of the kaleidoscope levels, respectively.

The first sub-task is a Rotation Recognition (RR) task. For rotation recognition pre-training the 1×1 patch of the level-1 kaleidoscope is randomly rotated by an angle $\theta \in \{0°, 90°, 180°, 270°\}$, although additional angles may be used. During the training process, the angle of the rotated patch is used as the target label. The hidden output of the $K_1$ patch is fed into an FC layer followed by a softmax function. The final softmax output is used to predict the rotation angle. The objective of the RR task may be written mathematically as:

$$\mathcal{L}_{RR} = CE(y_r, \mathcal{F}(T,K,\theta)_{K^1\_hidden}) \quad (3)$$

where $y_r$ denotes the rotation angle.

The second sub task is a Jigsaw Puzzle Solving (JPS) task. The JPS task attempts to determine an original order or orientation of 2×2 image patches that have been randomly rearranged. JPS has been demonstrated to be suitable for self-supervised representation learning. Such a pretext task or surrogate task can mine the spatial relations among image patches. Based on this insight, the notion of a jigsaw puzzle is used to stimulate the model to learn the potential association from unordered 2×2 patch lists. For simplicity, the JPS problem is treated as a classification of the jigsaw permutations (4!=24 classes). The network architecture is similar to RR. The objective of the JPS task may be written as:

$$\mathcal{L}_{JPS} = CE(y_j, \mathcal{F}(T,K,\theta)_{K^2\_hidden}) \quad (4)$$

where $y_j$ denotes the jigsaw permutation.

The third subtask is a Camouflage Prediction (CP) task. To increase the discernment ability of the model, one or more patches are replaced with corresponding image patch at the same location and scale of another image. The camouflage prediction task is introduced to predict which patch has been replaced.

With the help of image and text clues, this task encourages the training process to observe the diversity among 3×3 patches. This task is named Camouflage Prediction (CP) because it essentially camouflages one patch then lets the model detect the camouflage patch. By pre-training the model with the CP task, the framework achieves a strong capacity to screen out the imparity with varied products. The CP prediction is also treated as a classification problem and its objective is denoted by:

$$\mathcal{L}_{CP} = CE(y_c, \mathcal{F}(T,K,\theta)_{K^3\_hidden}) \quad (5)$$

The fourth sub task is a Grey-to-Color Modeling (G2CM) task. Different from the masking strategy in existing models, which simply exchanges image embeddings with zero paddings, a smoother G2CM strategy is used that greys the image patches. The grey patch is then reconstructed to a color patch by regression, supervised by KL-divergence, which better caters to self-supervised learning. The objective of G2CM is to minimize the G2CM loss:

$$\mathcal{L}_{G2CM} = \Sigma KLD(k_{4i}, \mathcal{F}(T,K,\theta)_{K^4\_hidden}) \quad (6)$$

where KLD denotes the KL-divergence, which aims to minimize the distance of the reconstructed distribution to the target distribution and $k_{4i}$ is the masked-out patch(es) of the $K_4$ kaleidoscope patches.

The fifth sub task is a Blank-to-Color Modeling (B2CM) task. The last sub-task is B2CM. Similar to other pre-training methods that replace image feature embeddings with the same-dimension zeros sequence, a similar kind of patch masking scheme is adopted. This strongly tests the learning ability of a model that captures the contextual information. The objective of B2CM is to minimize the B2CM loss:

$$\mathcal{L}_{B2CM} = \Sigma KLD(k_{5i}, \mathcal{F}(T,K,\theta)_{K^5\_hidden}) \quad (7)$$

where $k_{5i}$ is the masked-out patch(es) of the $K_5$ kaleidoscope patched.

The aligned kaleidoscope patch modeling is introduced to enhance the ability of the model for spatial context structure (i.e., RR and JPS), classification (i.e., CP), and image generation (i.e., G2CM and B2CM). The individual training tasks may be performed individually as well as in combination in order to train the model on the total loss. The model pre-training should minimize the overall loss function as:

$$\mathcal{L}_{total} = \mathcal{L}_{AMLM} + \mathcal{L}_{ITM} + \mathcal{L}_{RR} + \mathcal{L}_{JSP} + \mathcal{L}_{CP} + \mathcal{L}_{G2CM} + \mathcal{L}_{B2CM}, \quad (8)$$

Each of the five different subtasks noted above may be applied to a respective patch group level. For example, the rotation recognition may be applied to the level 1 patch group, the jigsaw puzzle solving may be applied to the level 2 patch group, the camouflage prediction may be applied to the level 3 patch group, the grey-to-color prediction may be applied to the level 4 patch group and the blank-to-color prediction may be applied to the level 5 patch group. It will be appreciated that different training tasks may be used for different group levels. Further, the same training task may be applied to different group levels.

Figure 6:
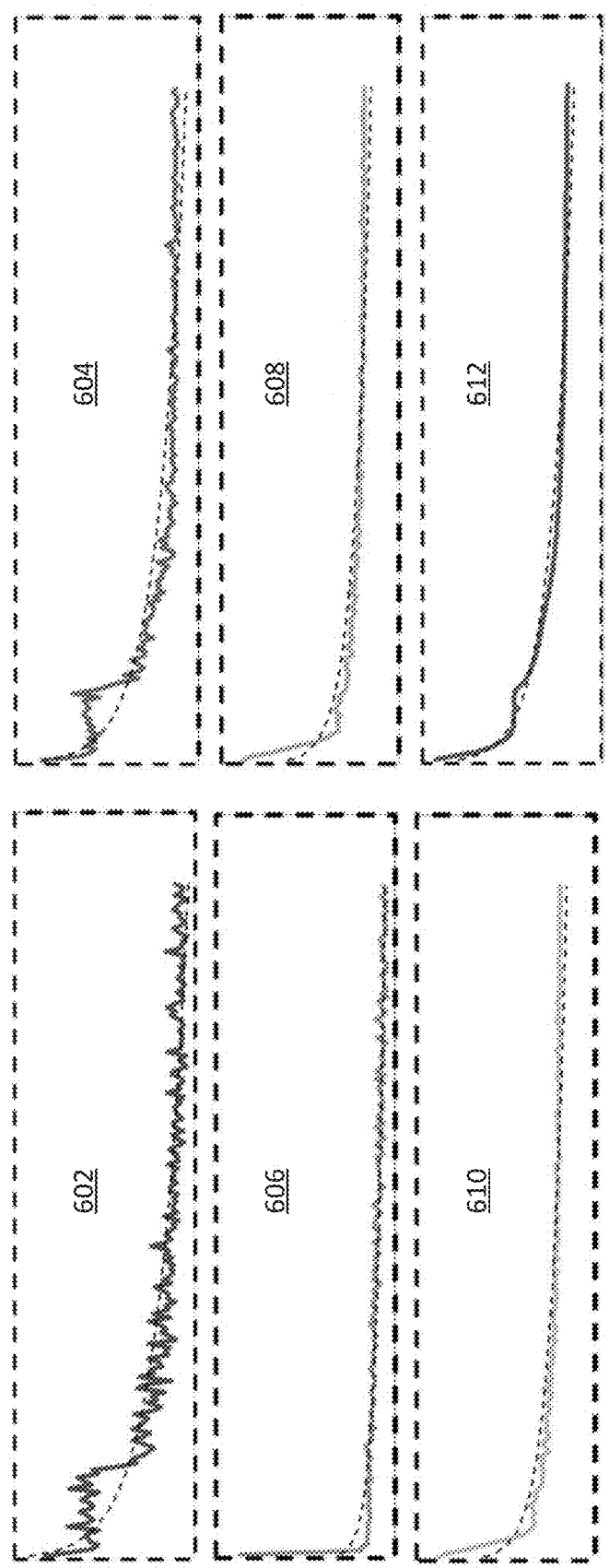
FIG. 6 depicts graphs of training task losses during training.

FIG. 6 depicts graphs of each training task loss during training. Graph 602 depicts the rotation loss, graph 604 depicts the jigsaw loss, graph 606 depicts the camouflage loss, graph 608 depicts the grey-to-color loss, graph 610 depicts the blank-to-color loss and graph 612 depicts the total loss. As can be seen from each of the graphs, the losses decay smoothly, showing that the pre-training process carries on as normal, and the designed tasks can be learned well from the transformer-based model.

The fine-grained patch cross-modality transformer model was evaluated on four VL tasks by transferring the pre-trained model to each target task and fine-tuning through end-to-end training.

For a fair comparison, the same settings as the Top-1 FashionBERT model were followed and the transformer based model described herein pre-trained on the Fashion-Gen dataset. The Fashion-Gen set contains 67,666 fashion products accompanied with text descriptions. Each product includes one to six images from different angles. Among all the image-text pairs, 260,480 were used for training, and 35,528 for testing.

The transformer-based model is based on the BERT framework and has: L=12, H=768, A=12. L is number of stacked Transformer blocks. H denotes the hidden activation, and A means the number of attention heads. The model was implemented with Tensorflow and uses 8*Tesla V100 for pre-training. The Adam optimizer is applied with a learning rate of 2e−5 and weight decay 1e−4. A warming-up strategy was applied for the first 5K steps.

The model was evaluated for four downstream VL tasks, including Image-Text Retrieval, Text-Image Retrieval, Category Recognition, and Fashion Captioning. The four tasks strongly cater to industrial applications in the fashion field.

The first task is Image-Text Retrieval (ITR). Image retrieval is a downstream task that requires the model to distinguish whether a sentence can effectively describe an image. The product images and titles were sampled as image-sentences pairs provided by the Fashion-Gen and consider the original product information as positive samples. At the same time, the dataset was shuffled and the un-matched image-sentence pairs considered as negative samples. To increase the difficulty, the positive and negative pairs were selected from the same sub-category, which is hard for model to differentiate. Rand@1, Rank@5, Rank@10 were used to evaluate the retrieval performance.

The second task is Text-Image Retrieval (TIR). The text retrieval task aims to rank product images according to their title. Similar to image retrieval, the ground-truth image in the pair was used as the positive sample and randomly sample 100 unrelated captions from other products in the same sub-category. By predicting the matching score, Rank@1, @5, @10 are used as metrics.

The third task is Category/SubCategory Recognition (CR/SUB). The category is a vital attribute for describing a product, and is especially useful in many real-life applications. This task is consider a classification task that judges the category and subcategory of a product, such as {SWEATERS, HOODIES}, {PANTS, TROUSERS}.

The fourth task is Fashion Captioning (FC). Image captioning has emerged as an important research topic with a rich literature in computer vision, and the accuracy on FC can evaluate the generation ability of cross-modality models.

The performance of the current model compared to other models on each of the downstream tasks is shown in FIG. 7 and FIG. 8.

FIG. 7 details the retrieval performances of different models on the Fashion-Gen dataset. In FIG. 7 SumR= (Rank@1+Rank@5+Rank@10)*100.

FIG. 8 details the category recognition and fashion captioning performances of different models on the Fashion-Gen dataset. In FIG. 8, Sum CLS=(AC+micro-F+macro-F)*100 and SumCAP=Bleu-4+Meteor+CIDEr+ROUGE+SPICE As can be seen from FIGS. 7 and 8, the current approach achieves significant improvement on nearly all evaluations, which demonstrates the model's excellent understanding and generation ability in the fashion domain. In the current model, the kaleidoscope patch strategy is used for attention-based alignment masking. The kaleidoscope pre-training task provides more semantic information from the image modality.

The above has described a universal pre-trained vision-language understanding architecture for fashion-based tasks. It includes a kaleidoscope patches generator, attention-based alignment generator, and alignment guided masking strategy. These components are easy to implement and cooperate closely to learn the both intra-modal and inter-modal image-text feature embeddings. The designed model is much more efficient than existing models, attains the new SOTA performance, and largely boosts the accuracy of many downstream tasks such as Image-Text Retrieval, Category Recognition, and Fashion Captioning.

Although certain components and steps have been described, it is contemplated that individually described components, as well as steps, may be combined together into fewer components or steps or the steps may be performed sequentially, non-sequentially or concurrently. Further, although described above as occurring in a particular order, one of ordinary skill in the art having regard to the current teachings will appreciate that the particular order of certain steps relative to other steps may be changed. Similarly, individual components or steps may be provided by a plurality of components or steps. One of ordinary skill in the art having regard to the current teachings will appreciate that the components and processes described herein may be provided by various combinations of software, firmware and/or hardware, other than the specific implementations described herein as illustrative examples.

The techniques of various embodiments may be implemented using software, hardware and/or a combination of software and hardware. Various embodiments are directed to apparatus, e.g. a node which may be used in a communications system or data storage system. Various embodiments are also directed to non-transitory machine, e.g., computer, readable medium, e.g., ROM, RAM, CDs, hard discs, etc., which include machine readable instructions for controlling a machine, e.g., processor to implement one, more or all of the steps of the described method or methods.

Some embodiments are directed to a computer program product comprising a computer-readable medium comprising code for causing a computer, or multiple computers, to implement various functions, steps, acts and/or operations, e.g. one or more or all of the steps described above. Depending on the embodiment, the computer program product can, and sometimes does, include different code for each step to be performed. Thus, the computer program product may, and sometimes does, include code for each individual step of a method, e.g., a method of operating a communications device, e.g., a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the method(s) described herein. The processor may be for use in, e.g., a communications device or other device described in the present application.

Numerous additional variations on the methods and apparatus of the various embodiments described above will be apparent to those skilled in the art in view of the above description. Such variations are to be considered within the scope.

What is claimed is:

1. A method of pre-training a predictive model in a fashion domain, the method comprising:
receiving an input image of a fashion product and input text describing the fashion product;
tokenizing the input text to generate a plurality of input text tokens;
generating a plurality of patch groups of one or more image patches of the input image, each of the patch groups of one or more image patches covering a common portion of the input image;
masking one or more of the image patches and the input text tokens;
generating a training embedding from the image patches and the input text tokens; and
training a cross modality transformer-based model to predict the masked one or more of the image patches and the input text tokens using the training embedding.

2. The method of claim 1, further comprising:
aligning one or more input text tokens with one or more aligned image patches based on a possible relevance of each of the input text tokens to respective ones of the aligned image patches.

3. The method of claim 2, wherein masking the one or more of the image patches and the input text tokens comprises:
for one or more of the input text tokens aligned with one or more aligned image patches:
selecting either a respective input text token or one or more of the aligned image patches aligned with the respective input text token; and
masking the selected one of the respective input text token or the aligned image patches.

4. The method of claim 3, wherein masking the selected input text token comprises replacing the input text token with one of:
a mask token; and
a token of a random word.

5. The method of claim 3, wherein masking the selected one or more aligned image patches comprises replacing one or more of the aligned image patches with one or more of:
a patch covering a similar location of a similar image;
a greyed version of an aligned image patch; and
a blank version of the aligned image patch.

6. The method of claim 5, wherein aligned image patches from a plurality of patch groups of the input image are masked.

7. The method of claim 2, wherein masking the one or more of the image patches and the input text tokens comprises preferentially masking the aligned one or more input text tokens and the aligned image patches.

8. The method of claim 2, wherein aligning one or more input text tokens with one or more aligned image patches comprises:
generating using a trained description model a text description of the input image, the trained description model provides an attention map for each token in the generated text description providing relevant regions of the input image that were relevant in generating the token;
matching one or more tokens of the generated text description with one or more tokens of the input text;
for each matched token of the input text, aligning the matched token with image patches corresponding to relevant regions of the attention map of the matched token.

9. The method of claim 8, wherein each matched token is aligned with an image patch from a plurality of patch groups.

10. The method of claim 1, wherein generating the training embedding comprises:
generating an image embedding from the image patches;
generating a text embedding from the input text tokens; and
generating the training embedding by concatenating the image embedding and the text embedding.

11. The method of claim 10, wherein generating the image embedding comprises:
adding location information and segment information to each image patch; and
generating the image embedding from the location information, segment information and image patch, and
wherein generating the text embedding from the input text tokens comprises:
adding position information and segment information to each input text token; and
generating the text embedding from the position information, segment information and input text token.

12. The method of claim 1, wherein training the transformer-based model comprises minimizing an overall loss function that is a summation of a plurality of individual loss functions for respective training tasks.

13. The method of claim 12, wherein the training tasks and the individual loss functions include one or more of:
an aligned masked language modelling task that attempts to predict masked text tokens with an individual loss function, $\mathcal{L}_{AMLM}$, defined as:

$\mathcal{L}_{AMLM} = \Sigma CE(t_i, \mathcal{F}(T,K,\theta)_{MSK\_hidden};$ an image and text matching task that attempts to predict if the text describes the image with an individual loss function, $\mathcal{L}_{ITM}$, defined as:

$\mathcal{L}_{ITM} = \Sigma CE(y_m, \mathcal{F}(T,K,\theta)_{CLS\_hidden};$ a rotation recognition tasks that attempt to predict a rotation angle of an image patch with an individual loss, $\mathcal{L}_{RR}$, function defined as:

$\mathcal{L}_{RR} = CE(y_r, \mathcal{F}(T,K,\theta)_{K^1\_hidden};$ a jigsaw puzzle solving task that attempts to predict a correct ordering of randomly ordered image patches with an individual loss function, $\mathcal{L}_{JPS}$, defined as:

$\mathcal{L}_{JPS} = CE(y_j, \mathcal{F}(T,K,\theta)_{K^2\_hidden};$ a camouflage prediction task that attempts to predict an image patch that has been replaced with a corresponding image patch of a different image with an individual loss function, $\mathcal{L}_{CP}$, defined as:

$\mathcal{L}_{CP} = CE(y_c, \mathcal{F}(T,K,\theta)_{K^3\_hidden};$ a grey-to-color modeling task that attempts to reconstruct color patch from a greyed image patch with an individual loss function, $\mathcal{L}_{G2CM}$, defined as:

$\mathcal{L}_{G2CM} = \Sigma KLD(k_{4i}, \mathcal{F}(T,K,\theta)_{K^4\_hidden};$ and a blank-to-color modeling task that attempts to reconstruct a patch from a blank patch with an individual loss function, $\mathcal{L}_{B2CM}$, defined as:

$\mathcal{L}_{B2CM} = \Sigma KLD(k_{5i}, \mathcal{F}(T,K,\theta)_{K^5\_hidden};$ where:
CE denotes the cross-entropy loss;
$\mathcal{F}$ is the cross-modality transformer function;
$\mathcal{F}(\bullet)_{MSK\_hidden}$ denotes the hidden output of masked-out tokens;
$\mathcal{F}(\bullet)_{CLS\_hidden}$ denotes the hidden output of the CLS token;
$\mathcal{F}(\bullet)_{Kx\_hidden}$ denotes the hidden output of the image patches for an image patch level x;
T denotes the masked-out text sequence;
K denotes the masked-out kaleidoscope patch sequence;
$\theta$ is a rotation angle;
$t_i$ is the text token that has been masked out;
$y_m$ denotes the text and image match label
$y_r$ denotes the rotation angle
$y_j$ denotes the jigsaw permutation;
$y_c$ denotes the camouflaged patch;
KLD denotes the KL-divergence; and
$k_{Ni}$ denotes the masked-out patches of the $K_N$ kaleidoscope patches.

14. A non-transitory computer readable medium having stored thereon instructions, which when executed by one or more processors configure a computing system to perform a method of pre-training a predictive model in a fashion domain, the method comprising:
receiving an input image of a fashion product and input text describing the fashion product;

tokenizing the input text to generate a plurality of input text tokens;
generating a plurality of patch groups of one or more image patches of the input image, each of the patch groups of one or more image patches covering a common portion of the input image;
masking one or more of the image patches and the input text tokens;
generating a training embedding from the image patches and the input text tokens; and
training a cross modality transformer-based model to predict the masked one or more of the image patches and the input text tokens using the training embedding.

15. The computer readable medium of claim 14, wherein the method further comprises:
aligning one or more input text tokens with one or more aligned image patches based on a possible relevance of each of the input text tokens to respective ones of the aligned image patches.

16. The computer readable medium of claim 15, wherein masking the one or more of the image patches and the input text tokens comprises:
for one or more of the input text tokens aligned with one or more aligned image patches:
selecting either a respective input text token or one or more of the aligned image patches aligned with the respective input text token; and
masking the selected one of the respective input text token or the aligned image patches.

17. The computer readable medium of claim 15, wherein masking the one or more of the image patches and the input text tokens comprises preferentially masking the aligned one or more input text tokens and the aligned image patches.

18. The computer readable medium of claim 15, wherein aligning one or more input text tokens with one or more aligned image patches comprises:
generating using a trained description model a text description of the input image, the trained description model provides an attention map for each token in the generated text description providing relevant regions of the input image that were relevant in generating the token;
matching one or more tokens of the generated text description with one or more tokens of the input text;
for each matched token of the input text, aligning the matched token with image patches corresponding to relevant regions of the attention map of the matched token.

19. The computer readable medium of claim 18, wherein each matched token is aligned with an image patch from a plurality of patch groups.

20. The computer readable medium of claim 14, wherein training the transformer-based model comprises minimizing an overall loss function that is a summation of a plurality of individual loss functions for respective training tasks.

21. The computer readable medium of claim 20, wherein the training tasks and the individual loss functions include one or more of:
an aligned masked language modelling task that attempts to predict masked text tokens with an individual loss function, $\mathcal{L}_{AMLM}$, defined as:
$$\mathcal{L}_{AMLM} = \Sigma CE(t_i, \mathcal{F}(T,K,\theta)_{MSK\_hidden};$$

an image and text matching task that attempts to predict if the text describes the image with an individual loss function, $\mathcal{L}_{ITM}$, defined as:
$$\mathcal{L}_{ITM} = \Sigma CE(y_m, \mathcal{F}(T,K,\theta)_{CLS\_hidden};$$

a rotation recognition tasks that attempt to predict a rotation angle of an image patch with an individual loss, $\mathcal{L}_{RR}$, function defined as:
$$\mathcal{L}_{RR} = CE(y_r, \mathcal{F}(T,K,\theta)_{K^1\_hidden};$$

a jigsaw puzzle solving task that attempts to predict a correct ordering of randomly ordered image patches with an individual loss function, $\mathcal{L}_{JPS}$, defined as:
$$\mathcal{L}_{JPS} = CE(y_j, \mathcal{F}(T,K,\theta)_{K^2\_hidden};$$

a camouflage prediction task that attempts to predict an image patch that has been replaced with a corresponding image patch of a different image with an individual loss function, $\mathcal{L}_{CP}$, defined as:
$$\mathcal{L}_{CP} = CE(y_c, \mathcal{F}(T,K,\theta)_{K^3\_hidden};$$

a grey-to-color modeling task that attempts to reconstruct color patch from a greyed image patch with an individual loss function, $\mathcal{L}_{G2CM}$, defined as:
$$\mathcal{L}_{G2CM} = \Sigma KLD(k_{4i}, \mathcal{F}(T,K,\theta)_{K^4\_hidden}; \text{ and}$$

a blank-to-color modeling task that attempts to reconstruct a patch from a blank patch with an individual loss function, $\mathcal{L}_{B2CM}$, defined as:
$$\mathcal{L}_{B2CM} = \Sigma KLD(k_{5i}, \mathcal{F}(T,K,\theta)_{K^5\_hidden},$$

where:
CE denotes the cross-entropy loss;
$\mathcal{F}$ is the cross-modality transformer function;
$\mathcal{F}(\bullet)_{MSK\_hidden}$ denotes the hidden output of masked-out tokens;
$\mathcal{F}(\bullet)_{CLS\_hidden}$ denotes the hidden output of the CLS token;
$\mathcal{F}(\bullet)_{Kx\_hidden}$ denotes the hidden output of the image patches for an image patch level x;
T denotes the masked-out text sequence;
K denotes the masked-out kaleidoscope patch sequence;
θ is a rotation angle;
$t_i$ is the text token that has been masked out;
$y_m$ denotes the text and image match label
$y_r$ denotes the rotation angle
$y_j$ denotes the jigsaw permutation;
$y_c$ denotes the camouflaged patch;
KLD denotes the KL-divergence; and
$k_{Ni}$ denotes the masked-out patches of the $K_N$ kaleidoscope patches.

22. A computer system comprising:
a processor for executing instructions;
a memory storing the instructions, which when executed by the processor configure the computer system to perform a method of pre-training a predictive model in a fashion domain, the method comprising:
receiving an input image of a fashion product and input text describing the fashion product;
tokenizing the input text to generate a plurality of input text tokens;
generating a plurality of patch groups of one or more image patches of the input image, each of the patch groups of one or more image patches covering a common portion of the input image;
masking one or more of the image patches and the input text tokens;
generating a training embedding from the image patches and the input text tokens; and
training a cross modality transformer-based model to predict the masked one or more of the image patches and the input text tokens using the training embedding.

23. The computer system of claim 22, wherein the method further comprises:
   aligning one or more input text tokens with one or more aligned image patches based on a possible relevance of each of the input text tokens to respective ones of the aligned image patches.

24. The computer system of claim 23, wherein masking the one or more of the image patches and the input text tokens comprises:
   for one or more of the input text tokens aligned with one or more aligned image patches:
      selecting either a respective input text token or one or more of the aligned image patches aligned with the respective input text token; and
      masking the selected one of the respective input text token or the aligned image patches.

* * * * *